United States Patent Office 3,448,158
Patented June 3, 1969

3,448,158
HYDROFORMYLATION OF OLEFINS
Lynn H. Slaugh, Lafayette, Calif., and Richard D. Mullineaux, Florissant, Mo., assignors to Shell Oil Company, New York, N.Y., a corporation of Delaware
No Drawing. Continuation-in-part of application Ser. No. 280,132, May 13, 1963. This application Jan. 28, 1966, Ser. No. 523,546
The portion of the term of the patent subsequent to Mar. 8, 1983, has been disclaimed
Int. Cl. C07c *45/04, 29/04, 45/10*
U.S. Cl. 260—604                8 Claims

ABSTRACT OF THE DISCLOSURE

Aldehydes and alcohols are produced by reacting a monoolefinic hydrocarbon with carbon monoxide and hydrogen, in the presence of cobalt-carbonyl-trialkylphosphite, at 100 to 250° C. and a pressure below 1500 pounds.

---

This application is a continuation-in-part of copending application Ser. No. 280,132, filed May 13, 1963, which is a continuation-in-part of copending application Ser. No. 46,071, filed July 29, 1960 and now abandoned.

This invention relates to the production of aldehydes and/or alcohols from olefinically unsaturated compounds. The invention relates more particularly to the production of aldehydes and/or alcohols by the addition of carbon monoxide and hydrogen to olefinic hydrocarbons in the presence of an improved catalyst.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. These processes known in the industry, and referred to herein as hydroformylation, involve reactions which may be shown in the general case by the following equation:

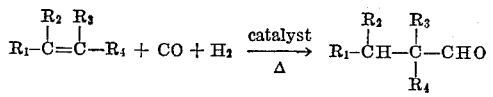

and/or

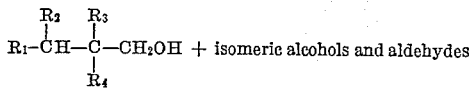

In the above equation, each R represents an organic radical, for example, hydrocarbyl, or a suitable atom such as hydrogen or a halogen. The above reaction is similarly applied to an olefinic linkage in a cycloaliphatic ring.

In the past, dicobalt octacarbonyl as such or in several different forms, generally has been used as the catalyst for the hydroformylation of olefins. This catalyst, which can be prepared from many forms of cobalt, usually decomposes rapidly unless high pressures (1000–4500 p.s.i.g.) of carbon monoxide are maintained. Correspondingly high pressures of hydrogen are also necessary. A most serious disadvantage of prior hydroformylation processes, however, has been the necessity of proceeding in two steps when alcohols are desired product. Thus in processes disclosed heretofore, it is generally necessary first to react the olefin to be hydroformylated with carbon monoxide and hydrogen to form the corresponding aldehyde. It is then necessary to carry out a second reaction with hydrogen to reduce the aldehyde to the alcohol in a separate operation. A different catalyst for the hydrogenation is usually needed for this second step since the hydroformylation catalysts heretofore employed are not sufficiently effective for this purpose. This results in the need for relatively expensive high-pressure equipment and for a large amount of such equipment to handle the two steps.

A further disadvantage inherent in processes directed to hydroformylation disclosed heretofore is a relative inability to direct the reactions involved to the production of predominantly terminal alcohols when the olefin contains more than two carbon atoms, particularly when the charge to the process comprises primarily internal olefins.

It is therefore an object of the present invention to provide an improved hydroformylation process enabling the more efficient production of aldehydes and/or alcohols by the catalytic reaction of olefinic compounds with carbon monoxide and hydrogen.

Another object of the present invention is the provision of an improved hydroformylation process enabling the more efficient production of aldehydes and/or alcohols by reaction of olefinic compounds with carbon monoxide and hydrogen in the presence of an improved hydroformylation catalyst.

Still another object of the present invention is the provision of an improved hydroformylation process enabling the more efficient single stage production of alcohols by the reaction of olefinic hydrocarbons with carbon monoxide and hydrogen in the presence of an improved catalyst enabling the use of substantially lower pressures than generally possible heretofore.

Still another object of the present invention is the provision of an improved process enabling the more efficient, direct single stage hydroformylation of internal olefins to reaction products predominating in terminal aldehydes and alcohols. Other objects and advantages of the present invention will become apparent from the following detailed description thereof.

In said applications Ser. Nos. 46,071 and 280,132, there is disclosed the execution of the hydroformylation of olefinic compounds with the aid of novel hydroformylation catalysts consisting essentially of a transition metal in complex combination with carbon monoxide and a biphyllic ligand containing a trivalent atom selected from Group V–A of the Periodic Table having an atomic number of from 15 to 51, wherein said trivalent atom has one available pair of electrons. The complex catalysts comprising cobalt in complex combination with carbon monoxide and one of the described biphyllic ligands are not necessarily equivalent with respect to their behavior as a hydroformylation catalyst. As disclosed and claimed in said copending application Ser. No. 280,132 those comprising a trialkylphosphine as the biphyllic ligand are outstanding in their ability to effect the direct single stage hydroformylation of normal olefins, including internal olefins, to normal terminal alcohols.

In contrast thereto the catalyst complexes comprising triarylphosphine, such as triphenylphosphine as ligand, possess behavior characteristics under hydroformylation conditions which, although accelerating reaction rate, detract materially from the attainment of alcohol yields and operating conditions commensurate with practical scale hydroformylation operations. The selectivity to the desired normal alcohols is relatively low and the relative insolubility of the triarylphosphine-containing complex in polar media including, for example, alcohols, ketones, etc. presents serious difficulties in the execution of operation procedures of the process. Surprisingly, however, the substitution of no more than two of the alkyl groups in the trialkyphosphine ligand by suitable aryl groups, for example, phenyl groups, enables the attainment of increased reaction rates while still maintaining solubility characteristics of the catalyst complex and yields of the desired alcohols commensurate with practical scale operation. A process for hydroformylating olefinic compounds in the presence of the complex catalysts comprising cobalt in combination with carbon monoxide and a mixed alkylarylphosphine as ligand is described and claimed in copending application Ser. No. 490,635 filed Sept. 27, 1965.

The use of trialkylphosphites as ligands in the complex catalysts of the type described herein results in catalysts differing materially in behavior characteristics. These phosphorus compounds are relatively low in cost and readily produced. The cobalt-carbonyl-trialkylphosphite complexes, however, differ markedly from the complexes comprising trialkylphosphines as ligands. Characteristics peculiar to the trialkylphosphite-containing ligands often renders difficult the attainment of uniformity and reproducibility of operating conditions, suitable yields, product distribution and catalyst life within the broad range of hydroformylation reaction conditions. It has now been found that these disadvantages are overcome to at least a substantial degree in the hydroformylation of olefinic hydrocarbons therewith by the use of well-defined operating conditions defined herein. The complex catalysts comprising trialkylphosphites as ligand are of advantage where a product distribution comprising both normal alcohols and aldehydes is desired, and particularly where the operation must be effected in units of relatively small capacity dictated by limited initial capital outlay.

In accordance with the present invention, mono-olefinic hydrocarbons are converted to hydroformylation products comprising saturated aldehydes and/or alcohols having one or more carbon atoms than the mono-olefinic hydrocarbon charged, by reacting the mono-olefinic hydrocarbon, in liquid phase, with carbon monoxide and hydrogen, at a temperature of from about 100° to about 250° C., and a pressure below 1500 pounds per square inch, in the presence of a cobalt catalyst comprising cobalt in complex combination with carbon monoxide and a phosphorus-containing ligand consisting essentially of a trialkylphosphite.

In its active form, the suitable complex cobalt catalysts will contain the cobalt component in a reduced valence state. This will normally be a zero valence state and may suitably be even lower, such as a —1 valence state.

As used throughout this specification and claims, the term "complex" means a coordination compound formed by the union of one or more electronically rich molecules or atoms capable of independent existence with one or more electronically poor molecules or atoms, each of which is also capable of independent existence.

In the suitable ligands containing trivalent phosphorus comprised in the complex catalyst employed in the process of the invention, the phosphorus atom has one available or unshared pair of electrons. Any trialkylphosphite provides the foregoing electronic configuration and is a suitable ligand for the cobalt-containing catalysts of the present invention. Trivalent phosphorus of such an electronic configuration is capable of forming a coordinate bond with cobalt in its 0 and —1 valence states. It thus will operate as a ligand in forming the desired cobalt complexes used as catalysts in the present process.

The suitable trialkylphosphites employed as ligands in the complex catalysts of the present invention may be represented by the empirical formula

(I)

wherein $R^1$, $R^2$, and $R^3$ each represent the same or a different alkyl group of straight chain, branched chain or cyclic structure. Suitable trialkylphosphite ligands represented by the foregoing Formula I comprises those wherein $R^1$, $R^2$ or $R^3$ each contain from 1 to 20 carbon atoms. Each $R^1$, $R^2$ or $R^3$ in the trialkylphosphites of the foregoing Formula I may suitably be a methyl, ethyl, propyl, butyl, isobutyl, pentyl, hexyl, heptyl, octyl, nonyl, decyl, undecyl, dodecyl, or the like, alkyl group of straight, branched or cyclic structure. The term "alkyl" as employed in this specification and attached claims is intended to include not only alkyl but cycloalkyl radicals. A preferred group of trialkylphosphite ligands are those wherein each of the alkyl groups contains from 1 to 12 carbons. Particularly preferred are the trialkylphosphites wherein each alkyl group is a lower alkyl, that is, an alkyl group of 1 to 6 carbons.

Suitable trialkylphosphite ligands comprise those wherein two, or all three, of the alkoxy groups are joined by carbon to carbon linkage to thereby form trialkylphosphites of cyclic structure as, for example, in 1-phospha-2,8,9-trioxabicyclo-[3.3.3] undecane.

Suitable catalysts within the scope of those employed in the process of the invention include, for example, the trialkylphosphite-cobalt-carbonyl complexes represented by the simplest empirical formula:

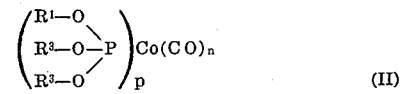
(II)

wherein $R^1$, $R^2$ and $R^3$ each have the meaning given with respect to the definition of Formula I, and $p$ and $n$ are integers, each having a value of at least 1 and whose sum is 4.

It is to be understood that the catalysts identified by Formula II may comprise two or more of the simple units. For example, in the suitable catalysts, the complex between cobalt, carbon monoxide, and phosphorus-containing ligand, identified by the foregoing empirical Formula II, may be monomeric in structure or may be composed of several monomeric units. Thus, the complex formed between cobalt, carbon monoxide and trialkylphosphite, such as, for example, trimethylphosphite-cobalt-carbonyl, tri-n-laurylphosphite-cobalt-carbonyl, etc., may be present as a dimer, as in $[(C_2H_5O)_3PCo(CO)_3]_2$ and $[(C_{12}H_{24}O)_3PCo(CO)_3]_2$.

Specific examples of suitable catalysts of the above-defined class comprise complexes between cobalt, carbon monoxide, and one of the following trialkylphosphites:

trimethylphosphite
triethylphosphite
tripropylphosphite
tributylphosphite
tri-n-laurylphosphite
tri-iso-octylphosphite
tricyclohexylphosphite
dimethylethylphosphite
diethylmethylphosphite
diethylcyclohexylphosphite
1-phospha-2,8,9-trioxabicyclo[3.3.3]undecane
5-methyl-1-phospha-2,8,9-trioxabicyclo]3.3.3]undecane.

The process of the invention is not limited with respect to the source of the cobalt-containing complexes used as catalysts in the process of this invention. They may be obtained from any suitable source and be prepared by a diversity of methods. A convenient method is to combine an organic or inorganic salt of cobalt with the suitable phosphorus-containing ligand, for example, trimethylphosphite in liquid phase. Suitable cobalt salts comprise, for example, cobalt carboxylates such as acetates, octoates, etc., as well as cobalt salts of mineral acids such as chlorides, sulfates, sulfonates, etc. The valence state of the cobalt may then be reduced and the cobalt-containing complex formed by heating the solution in an atmosphere of hydrogen and carbon monoxide. The reduction may be performed prior to the use of the catalysts or it may be accomplished simultaneously with the hydroformylation process of this invention. Alternatively, the catalysts may be prepared from a carbon monoxide complex of cobalt. For example, it is possible to start with dicobalt octacarbonyl and by heating this substance with the suitable phosphorus-containing ligand of the type previously described, for example, trimethylphosphite, the ligand will replace one or more of the carbon monoxide molecules, producing the desired complex catalyst. This method is very convenient for regulating the number of carbon monoxide molecules and phosphorus-containing ligand molecules present in the catalyst. Thus, by increasing the amount of phosphorus-containing ligand added to the dicobalt octacarbonyl more of the carbon monoxide molecules are replaced.

In accordance with the invention, olefinic compounds are hydroformylated to reaction products predominating in aldehydes and/or alcohols by intimately contacting the olefinic compound in liquid phase with carbon monoxide and hydrogen in the presence of the above-defined catalysts comprising a complex of cobalt with both carbon monoxide and a trivalent phosphorus-containing ligand consisting essentially of a trialkylphosphite at well-defined conditions of temperature and pressure.

Hydroformylation in accordance with the present invention is carried out at pressures not exceeding 1500 p.s.i.g. and as low as 1 atmosphere and less. Under comparable conditions, catalysts of the prior art such as dicobalt octacarbonyl, decompose and become inactive. The specific pressure below 1500 p.s.i.g. preferably used will be governed to some extent by the specific charge and complex catalyst employed. In general, pressures in the range of from about 300 to about 1250 p.s.i.g. and particularly in the range of from about 400 to about 800 p.s.i.g. are preferred.

Temperatures employed range from about 100° to about 250° C., and preferably about 150° to about 210° C.

Efficiency of the process in terms of catalyst life and yields is substantially improved by avoiding the introduction into the reaction system of dialkylphosphites in any substantial amount. To this effect secondary phosphites are preferably removed from catalyst components and particularly from the trialkylphosphite starting material. This may be effected by any suitable procedure. Substantial improvements in results are obtained by treating the trialkylphosphite starting material by direct contact with metallic sodium prior to its use in preparing the catalyst complex. Thus, the trialkylphosphite may suitably be predistilled over sodium.

The trialkylphosphite may suitably be prepared within the system by adding phosphorus trichloride to a portion of the alcohol produced in the process, preferably in the presence of a hydrogen chloride acceptor, for example, a tertiary amine. The alcohol so employed may constitute a portion of an alcohol-containing recycle stream.

The ratio of catalyst to the olefin to be hydroformylated is generally not critical. Solvents are not required. However, the use of solvents which are inert, or which do not interfere to any substantial degree with the desired hydroformylation reaction under the conditions employed, may be used within the scope of the invention. Saturated liquid hydrocarbons, for example, may be used as solvent in the process, as well as ketones, ethers, and the like. Molar ratios of catalyst to olefin between about 1:1000 and about 10:1 are found to be satisfactory; higher or lower catalyst to olefin ratios may, however, be used within the scope of the invention.

The ratio of hydrogen to carbon monoxide charged may vary widely within the scope of the invention. In general, a mole ratio of hydrogen to carbon monoxide of at least about 1 is employed. Suitable ratios of hydrogen to carbon monoxide comprise those within the range of from about 1 to about 10. Higher or lower ratios may, however, be employed within the scope of the invention. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the alcohol is the desired product, two moles of hydrogen and one mole of carbon monoxide react with each mole of olefin. The minimum ratio of hydrogen to carbon monoxide preferably employed will, however, generally be in excess of the stoichiometric equivalent based on product desired.

An advantage of the present invention is the ability to effect the direct, single stage hydroformylation of the olefins to a reaction mixture wherein the alcohols predominate over the aldehydes at relatively low pressures. The alcohols obtained from the starting olefins are furthermore generally primarily the open chain or normal isomers. By varying the operating conditions within the range described herein, the ratio of aldehyde to alcohol product may be varied. A particularly valuable aspect of the invention resides in its ability to effect the direct, single stage hydroformylation of internal normal olefins, having for example, from 4 to 19 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehyde and alcohols having one more carbon than the olefins in the charge and wherein these alcohols are the predominant reaction product. Such suitable feeds consisting of olefinic hydrocarbon fractions include, for example, $C_7$, $C_8$, $C_9$, $C_{10}$ and higher olefinic fractions as well as olefinic hydrocarbon fractions of wider boiling ranges such as $C_7$–$C_9$, $C_{10}$–$C_{13}$, $C_{14}$–$C_{17}$ olefinic hydrocarbon fractions and the like.

Under the above-defined conditions, the olefinic charge will react with carbon monoxide and hydrogen with the formation of reaction products comprising aldehydes and/or alcohols having one more carbon atom per molecule than the olefin charged.

The reaction mixtures obtained may be subjected to suitable catalyst and product separating means comprising one or more such steps, for example, as stratification, flashing, solvent extraction, distillation, fractionation, adsorption, etc. The specific method of product and catalyst separation preferably employed will be governed to some extent by the specific complex and reactants charged. The stability of the complex catalysts at subatmospheric and superatmospheric pressures over a relatively wide temperature range as indicated above, makes possible the use of any of the available product separating means. Catalyst, or components thereof, as well as uncoverted charge, and solvent, when employed, may be recycled in part or entirety to the reaction zone.

Make-up, preformed cobalt-carbonyl-trialkylphosphite complex, or separate components of the complex capable of producing the complex in situ in the reaction zone, may be added to material separated from the reactor effluence which is being recycled to the reaction zone. A part of the alcoholic reaction product may, if desired, be recycled to the reactor to function as solvent and/or diluent and/or suspending medium for catalyst, catalyst components, and the like, passing to the reaction zone. A part or all of the aldehydic hydroformylation products may optionally be recycled to the reaction zone or may be subjected to hydroformylation conditions in a second and separate reaction zone in the presence of a cobalt catalyst in complex combination with carbon monoxide and a tert. phosphorus ligand. The tert. organo phosphorus component of the complex catalyst used in such second hydroformylation step need not be the same as that used in the first step. For example, a trialkylphosphite-containing complex may be used in the first hydroformylation step and a trialkylphosphine in the second.

The process of this invention is generally applicable to the hydroformylation of any aliphatic or cycloaliphatic compound having at least one ethylenic carbon-to-carbon bond. Thus, it is applied to the hydroformylation of olefins comprising the ethylenically unsaturated hydrocarbons having, for example, from 2 to 19 carbons, to reaction mixtures predominating in aliphatic aldehydes and alkanols having one more carbon atom than the starting olefin. The invention is used to advantage in the hydroformylation of carbon-to-carbon ethylenically unsaturated linkages in unsaturated hydrocarbons. Monoolefins such as ethyl propylene, butylenes, amylenes, hexylenes, heptylenes, octylenes, nonylenes, decylenes, undecylenes, dodecylenes, and the homologues, are examples of suitable unsaturated hydrocarbons hydroformylated in the process of the invention. The suitable unsaturated hydrocarbon feeds include both branched- and straight-chain compounds having one or more ethylenic or olefinic sites. When two or more double bonds are present these may be conjugated, at in 1,3-butadiene, nonconjugated, as in 1,5-hexadiene. In the case of polyolefins, it is possible to hydroformylate only one of the olefinic sites or several or all of these sites. The unsaturated carbon-to-carbon olefinic linkages may be between terminal and their adjacent carbon atoms, as in 1-pentene, or between internal chain carbon atoms, as in 4-octene.

Hydroformylation of macromolecular materials involving acyclic units of the above types such as polydiolefins like polybutadiene, as well as copolymers of olefins and diolefins like the styrene-butadiene copolymer, is also comprised within the scope of the invention.

Hydrocarbon cyclic compounds are equally suitable for use in this invention. This group includes the unsaturated alicyclic hydrocarbons such as the cyclic olefins containing carbon-to-carbon unsaturation such as the cycloalkenes like cyclopentene, cyclohexene, and cycloheptene. Also included in this category are the terpenes and fused-ring polycyclic olefins, such as 2,5-bicyclo(2,2,1)-heptadiene, 1,4,4a,5,8,8a-hexahydro-1,4,5,8-dimethanonaphthalene and the like.

The process of this invention may also be used to hydroformylate ethylenic carbon-to-carbon linkages of non-hydrocarbons. Thus, it is possible to hydroformylate olefinically unsaturated alcohols, aldehydes, and acids to corresponding alcohols, aldehydes, and acids containing an aldehyde or hydroxy group on one of the carbon atoms previously involved in the olefinic bond of the starting material. The following are a few specific examples of different types of olefinic compounds that may be hydroformylated in accordance with the invention and the products obtained thereby:

The olefinic charge to the process of the invention may comprise two or more of the above-defined suitable olefins. Olefinic hydrocarbon fractions are hydroformylated under the conditions above-defined to mixtures of aldehydes and alcohols in which the alcohols predominate.

The following examples are illustrative of the process of this invention. It is to be understood that these examples are given only for illustration and are not to be construed as limiting the invention in any way.

Example I

Stability of the cobalt-carbonyl-trialkylphosphite complex catalyst relative to dicobaltoctacarbonyl at the low pressure hydroformylation conditions is shown in the following experiments:

In four separate experiments 1-pentene was subjected to hydroformylation conditions by reacting 1-pentene with carbon monoxide and hydrogen at a pressure below 550 p.s.i. in the presence of a cobalt catalyst. In one experiment identified by the designation A the catalyst used was dicobalt octacarbonyl. In two other experiments identified by the designations B and C, respectively, the catalyst used was cobalt-carbonyl-triethylphosphite complex prepared in situ by adding triethylphosphite in n-hexane to dicobaltoctacarbonyl and heating at a temperature of about 200° C. in the presence of hydrogen and carbon monoxide. Conditions used and results obtained in terms of catalyst stability are shown in the following Table A:

TABLE A

| | Experiment | | |
|---|---|---|---|
| | A | B | C |
| Catalyst | Cobalt diocta-carbonyl | Cobalt-carbonyl-triethylphosphite | |
| Solvent | n. Hexane | n. Hexane | n. Hexane |
| Cat. concentration in terms mmoles Co metal | 2 | 2 | 2 |
| 1-pentene charge mmoles | 64 | 18 | 64 |
| Ratio CO/H₂ | 1 | 1 | 0.5 |
| Initial pressure, p.s.i.g | 500 | 540 | 520 |
| Temperature, °C | 195 | 206 | 195 |
| Length of experiment, hr | 1.0 | 3.6 | 24.7 |
| C₆ alcohol in C₆ aldehyde-alcohol product, percent | 1.7 | 95.6 | 70.0 |
| Extent of catalyst decomposition | Complete | None | Slight |

Example II

Pentene was hydroformylated by reaction with carbon monoxide and hydrogen at low pressure in the presence of a complex catalyst consisting of cobalt in complex com-

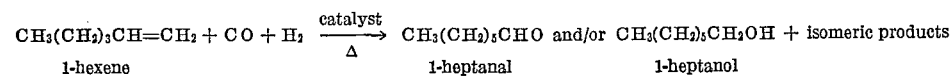

1-hexene → 1-heptanal, 1-heptanol

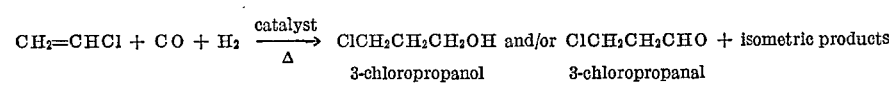

3-chloropropanol, 3-chloropropanal

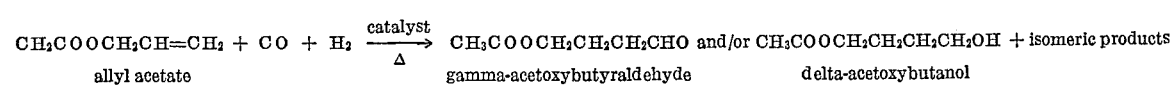

allyl acetate → gamma-acetoxybutyraldehyde, delta-acetoxybutanol

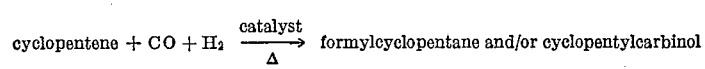

cyclopentene + CO + H₂ → formylcyclopentane and/or cyclopentylcarbinol

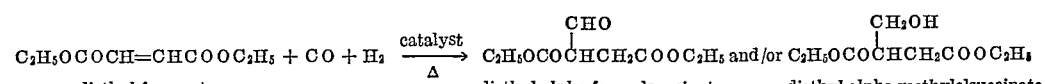

diethyl fumarate → diethyl alpha-formylsuccinate, diethyl alpha-methylolsuccinate

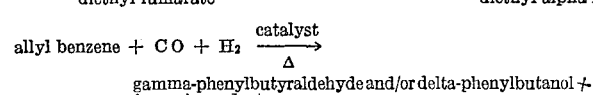

allyl benzene + CO + H₂ → gamma-phenylbutyraldehyde and/or delta-phenylbutanol + isomeric products bination with triethylphosphite under the conditions set forth in the following Table B. The catalyst complex was prepared in situ by combining dicobalt octacarbonyl with triethylphosphite in a mole ratio of triethylphosphite/cobalt of 17, in 20 ml. of hexane solvent, and heating in an atmosphere of carbon monoxide and hydrogen at 195° C. Results obtained in terms of $C_6$ alcohols and aldehydes being produced at the end of 43 hours of operation are set forth below:

TABLE B

Charge:
  Catalyst _____ (1)
  Catalyst concentration based on monomeric
    form _____molar__ 0.071
  Hexane solvent ml. _____ 20
  1-pentene, moles _____ 64
  Temperature _____° C__ 195
  Pressure (max.) p.s.i.g. _____ 550
  $H_2$/CO (mole ratio) _____ 1.9
  Time, hrs. _____ 43
$C_6$ alcohol product, mmoles _____ 22
$C_6$ aldehyde product, mmoles _____ 0.5

1 Cobalt-carbonyl-triethylphosphite complex.

Example III 1-pentene was hydroformylated at low pressure in the presence of a catalyst consisting of the complex: cobalt-carbonyl-trimethylphosphite. The complex catalyst was prepared in situ by combining 35 mmoles of trimethylphosphite with an amount of dicobalt octacarbonyl corresponding to 2 mmoles of Co metal, in hexane solvent, and heating the mixture at 195° C. and 520 p.s.i. in an atmosphere of carbon monoxide and hydrogen. Sixty-four mmoles of pentene was reacted with carbon monoxide and hydrogen, using a mole ratio of $H_2$/CO of about 2, in the presence of the cobalt-carbonyl-trimethylphosphite complex, at 195° C. and a pressure of 480 p.s.i.g. The length of the operation was 8 hours. There were obtained 4.1 mmoles of $C_6$ aldehydes and 6.9 mmoles of $C_6$ alcohols. No catalyst decomposition was evident.

Example IV

Sixty-four mmoles of 1-pentene was hydroformylated by reaction with carbon monoxide and hydrogen, at 195° C. and a pressure of about 500 p.s.i.g., in the presence of a preformed complex catalyst consisting of cobalt-carbonyl-triethylphosphite in 20 ml. of n-hexane solvent. The hydrogen and carbon monoxide were used in a mole ratio of $H_2$/CO of 1.9. The catalyst was present in an amount equivalent to 2 mmoles of cobalt metal. The length of the operation was 9 hours. There were obtained 1 mmole of $C_6$ aldehydes and 25.7 moles of $C_6$ alcohols. No catalyst decomposition was evident.

Example V

In a low pressure hydroformylation 64 mmoles of 1-pentene were reacted as the carbon monoxide and hydrogen at 195° C. and a pressure of 450 p.s.i.g. in the presence of a complex catalyst consisting of cobalt-carbonyl-triethylphosphite. The catalyst complex was present in an amount equivalent to 2 mmoles of Co metal. The carbon monoxide and hydrogen were charged in a $H_2$/CO mole ratio of 2. The catalyst complex was prepared in situ by combining 35 mmoles of triethylphosphite with an amount of cobalt acetate equivalent to 2 mmoles of cobalt metal in 20 cc. of bis(2-ethoxyethyl)ether solvent. The duration of the experiment was 27 hours. There were produced 2.1 mmoles of $C_6$ aldehydes and 14.2 mmoles of $C_6$ alcohols.

Example VI

In a low pressure hydroformylation, octene-1 was hydroformylated by reacting octene-1 with carbon monoxide and hydrogen in the presence of a complex cobalt catalyst consisting of cobalt in complex combination with both carbon monoxide and triethylphosphite, represented by the empirical formula $[[(C_2H_5O)_3P]Co(CO)_3]_2$, prepared in situ. Conditions employed and results obtained are set out in the following table:

Complex catalyst concentration in terms of mmole
  Co _____ 2
1-octene charge, mmole _____ 96
Temperature ° C. _____ 175
Reaction time, hr. _____ 6.25
Initial pressure, p.s.i.a. _____ 430
Final pressure, p.s.i.a. _____ 445
$H_2$/CO ratio _____ 2
Olefin conversion, percent _____ 66
Selectivity to:
  $C_9$ aldehydes _____ 13
  $C_9$ alcohols _____ 54
  n-Nonyl alcohol _____ 38

Example VII n-Tridecanol was prepared by reacting dodecene-1 with carbon monoxide and hydrogen, using a ratio of $H_2$:CO of 2.1, at 200° C. and 1000 p.s.i.g. in the presence of a catalyst consisting of cobalt-carbonyl-tributylphosphite $[[(C_4H_9O)_3P]Co(CO)_3]_2$. The concentration of the catalyst in the reaction mixture based on cobalt metal was 0.2%. The cobalt-carbonyl-tributylphosphite complex used as catalyst was prepared in situ by combining tributylphosphite, which had been purified by distillation over sodium, to dicobaltoctacarbonyl in a ratio of tributylphosphite to dicobalt octacarbonyl of 4 and heating the mixture to 200° C. in the presence of a mixture of carbon monoxide and hydrogen. At a dodecene conversion of 61.6% there was obtained a conversion to $C_{13}$ aldehydes of 9.9% and to $C_{13}$ alcohols of 32.3%. The alcohol product contained 72.6% n-tridecanol.

The operation was repeated under substantially identical conditions but with the exception that the ligand in the catalyst complex consisted of 1-phospha-2,8,9-trioxobicyclo-[3.3.3]-undecane

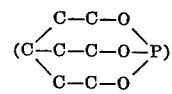

instead of tributylphosphite. There was obtained a dodecene conversion of 46.3% with a conversion to $C_{13}$ aldehydes of 5.8% and to $C_{13}$ alcohols of 19.2%. The $C_{13}$ alcohols obtained contained 66.7% n-tridecanol.

We claim as our invention:

1. The process for the production of aldehydes and alcohols, which comprises reacting a mono-olefinic hydrocarbon, at a temperature of from about 100 to about 250° C., and a pressure of from about 1 atmosphere to 1500 p.s.i.g., in the presence of a complex catalyst represented by the simplest empirical formula $[(RO)_3P]_pCo(CO)_n$ wherein R is an alkyl radical having from 1 to 20 carbons, and $p$ and $n$ are integers whose sum is 4 and which each have a value of at least 1, thereby reacting said mono-olefinic hydrocarbon with carbon monoxide and hydrogen with the formation of aldehydes and alcohols having one more carbon atom than said mono-olefinic hydrocarbon.

2. The process in accordance with claim 1 wherein said R is a lower alkyl.

3. The process in accordane with claim 1 wherein said R is methyl.

4. The process in accordance with claim 1 wherein said R is butyl.

5. The process in accordance with claim 1 wherein said complex catalyst is the complex of the simplest empirical formula

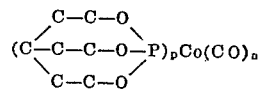

wherein $p$ and $n$ are integers whose sum is 4 and which each have a minimum value of 1.

6. The process in accordance with claim 1 wherein said catalyst complex is the complex represented by the empirical formula $[[P(OR)_3]_pCo(CO)_n]_2$.

7. The process in accordance with claim 6 wherein said catalyst complex is the complex represented by the empirical formula $[[(C_4H_9O)_3P]Co(CO_3)]_2$.

8. The process in accordance with claim 5 wherein said monoolefinic hydrocarbon is dodecene and said aldehydes and alcohols are n-tridecanal and n-tridecanol.

References Cited

UNITED STATES PATENTS

| 3,274,263 | 9/1966 | Greene et al. | |
|---|---|---|---|
| 3,102,899 | 9/1963 | Cannell | 260—439 |

LEON ZITVER, *Primary Examiner.*

R. H. LILES, *Assistant Examiner.*

U.S. Cl. X.R.

252—431; 260—439, 483, 484, 598, 599, 617, 618, 632